(12) United States Patent
Baghernejad

(10) Patent No.: US 7,470,088 B2
(45) Date of Patent: Dec. 30, 2008

(54) METHOD AND APPARATUS FOR LAYING A PIPELINE

(76) Inventor: Massoud Baghernejad, Flat 8 Hilton House, Amherst Road, London (GB) W13 8NF ( * ) Notice: Subject to any disclaimer, the term of this patent is extended or adjusted under 35 U.S.C. 154(b) by 145 days.

(21) Appl. No.: 10/578,475

(22) PCT Filed: Sep. 7, 2004

(86) PCT No.: PCT/EP2004/009949

§ 371 (c)(1),
(2), (4) Date: Feb. 20, 2007

(87) PCT Pub. No.: WO2005/045295

PCT Pub. Date: May 19, 2005

(65) Prior Publication Data

US 2007/0196179 A1    Aug. 23, 2007

(30) Foreign Application Priority Data

Nov. 7, 2003    (GB) ................ 0326052.8

(51) Int. Cl.
*F16L 1/16*    (2006.01)
(52) U.S. Cl. .................... 405/171; 405/168.2
(58) Field of Classification Search ......... 405/169–172, 405/168.1, 168.2
See application file for complete search history.

(56) References Cited

U.S. PATENT DOCUMENTS

| 3,568,456 | A |   | 3/1971  | VanLoenen |         |
|-----------|---|---|---------|-----------|---------|
| 4,107,802 | A |   | 8/1978  | Patinet et al. | |
| 4,183,697 | A |   | 1/1980  | Lamy |        |
| 4,191,494 | A | * | 3/1980  | Nakamura et al. | 405/171 |
| 4,493,590 | A |   | 1/1985  | Ayers et al. | |
| 5,575,590 | A | * | 11/1996 | Drost et al. | 405/171 |
| 6,030,145 | A | * | 2/2000  | Stewart et al. | 405/171 |
| 6,742,594 | B2| * | 6/2004  | Langford et al. | 405/171 |

FOREIGN PATENT DOCUMENTS

EP    0 931 965 A2    7/1999

* cited by examiner

*Primary Examiner*—Frederick L Lagman
(74) *Attorney, Agent, or Firm*—Rothwell, Figg, Ernst & Manbeck p.c.

(57) ABSTRACT

A method and apparatus for laying an underwater pipeline are provided. The method includes the steps of constructing lengths of pipeline by endwise connection of a plurality of pipe segments and securing bend restriction means along the length of said lengths of pipeline. The bend restriction means is arranged to prevent the lengths of pipeline from bending by more than a predetermined maximum amount. Flotation means are secured to the lengths of pipeline such that the lengths of pipeline are held adjacent the surface of the ocean and the lengths of pipeline and the flotation means are released from each length of pipeline so that the length of pipeline sinks to the ocean floor.

13 Claims, 9 Drawing Sheets

METHOD AND APPARATUS FOR LAYING A PIPELINE

CROSS REFERENCE TO RELATED APPLICATIONS

This application is a 35 U.S.C. § 371 National Phase Entry Application from PCT/EP2004/009949, filed Sep. 7, 2004, and designating the United States, which claims the benefit of GB 0326052.8, filed Nov. 7, 2003, the entire content of each of which are incorporated herein by reference.

BRIEF DESCRIPTION OF THE INVENTION

The present invention relates to a method and apparatus for installation of offshore pipelines.

FIELD OF THE INVENTION

The installation of offshore pipelines for transportation of hydrocarbon from an offshore location generally involves the use of specialized pipe laying barges to lay the pipe segments on the ocean bed.

A common method for laying the pipeline involves the use of pipe laying barges carrying short lengths of pipe, for example 12 meters, which are welded end to end along the length of the pipeline on the pipe laying barge. This method requires the barges to be specially equipped, to both carry the pipe segments and weld and lay the segments.

It is common for such pipe laying barges to require crews of around 200 people of varying technical expertise to carry out the operation. It is typical for such operations to be able to lay around 1 to 2 kilometers of pipeline per day at a cost (based on current figures) of around 0.3 to 0.5 million USD per day.

The current invention relates to a method of installing offshore pipeline which does not require the use of the above mentioned specialized pipe laying barges, thus reducing the cost of pipe laying operations, and which allows a longer length of pipeline to be installed per day.

SUMMARY OF THE INVENTION

In accordance with one aspect of the present invention there is provided a method for laying an underwater pipeline comprising the steps of:

constructing lengths of pipeline by endwise connection of a plurality of pipe segments;

securing bend restriction means to said lengths of pipeline, the bend restriction means being arranged to prevent the lengths of pipeline from bending by more than a predetermined maximum amount;

securing flotation means to the lengths of pipeline such that the lengths of pipeline are held adjacent the surface of the ocean;

towing the lengths of pipeline to the desired location; and connecting each length of pipeline to an adjacent length of pipeline and altering the buoyancy of the flotation means or releasing the flotation means from each length of pipeline so that the length of pipeline sinks to the ocean floor.

In accordance with another aspect of the present invention there is provided apparatus for laying an underwater pipeline comprising:

bend restriction means arranged to be secured to lengths of pipeline formed by endwise connection of a plurality of pipe segments, the bend restriction means being arranged to prevent the lengths of pipeline from bending by more than a predetermined maximum amount; and flotation means arranged to be secured to the lengths of pipeline such that the lengths of pipeline are held adjacent the surface of the ocean;

wherein the flotation means are releasable from the length of pipeline or may have their buoyancy altered such that the lengths of pipeline may be towed to a desired location and sunk to the ocean floor by release of the flotation means or altering the buoyancy of the flotation means.

DESCRIPTION OF THE DRAWINGS

The present invention will now be described, by way of example, with reference to the accompanying drawings, in which:

FIG. 7b is a top view of the pipeline location means of FIG. 7a;

DESCRIPTION OF THE INVENTION

Referring to the Figures, there is shown a method of and apparatus for laying an underwater pipeline 10 comprising a plurality of pipe segments 12. The pipe segments 12 are endwise connected onshore by a known means, such as welding, to form one or more lengths of pipeline 14. The lengths of pipeline 14 are fabricated in the total length desired for the pipeline 10 or in multiples of a length that would, in total, form the desired length of the pipeline 10. For example, the lengths of pipeline 14 may be in the order of 5 to 10 kilometers. The use of such lengths of pipeline 14 would allow large sections of the pipeline 10 to be installed in a single operation.

Figure 1:
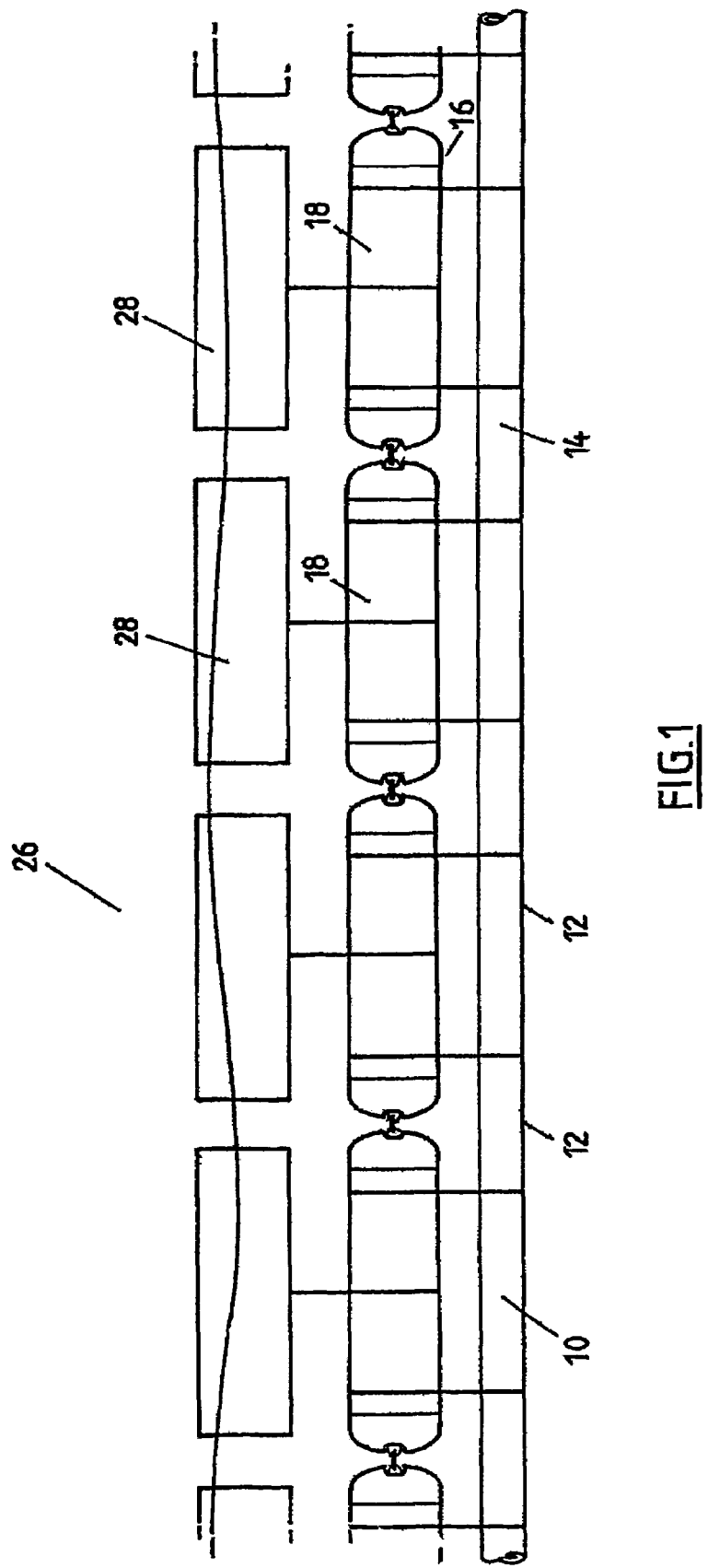
FIG. 1 is a side view of a length of pipeline prepared for laying according to the present invention.
Figure 2:
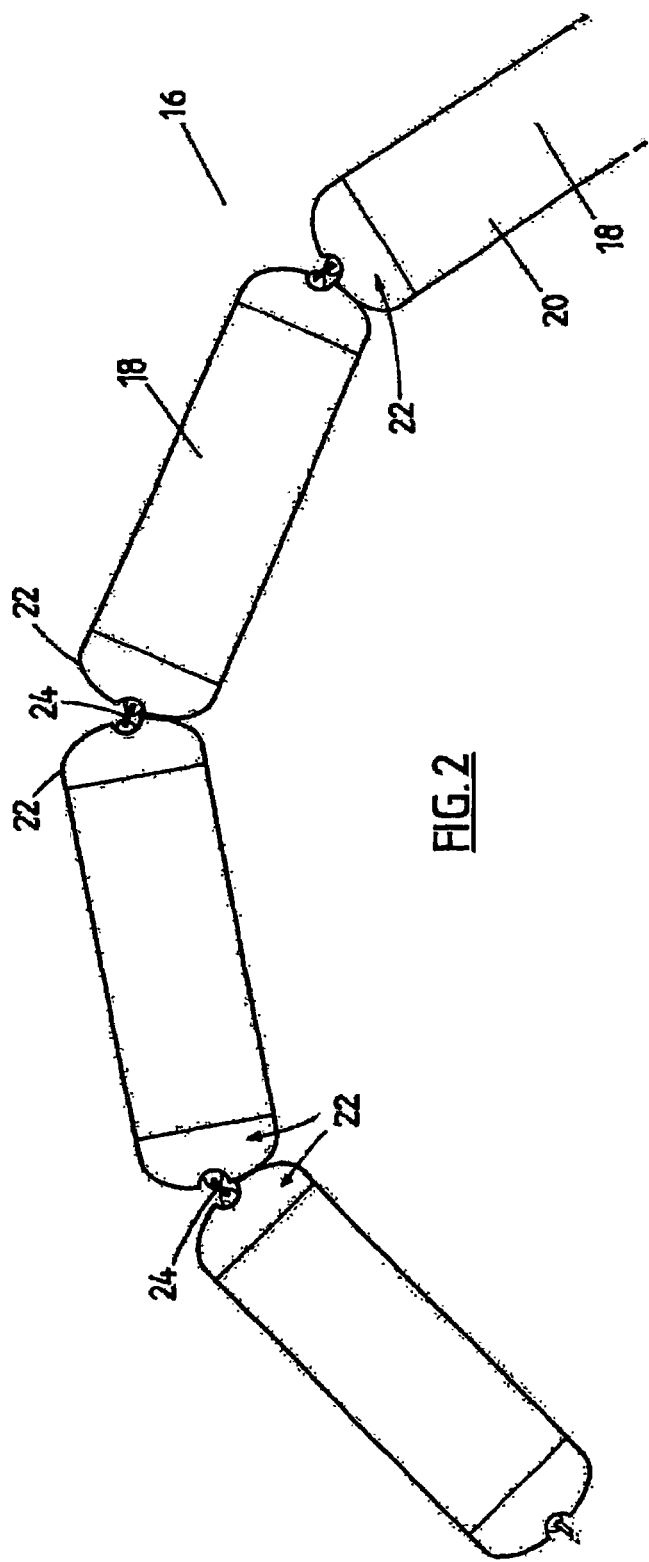
FIG. 2 is a side view of the bend restriction means of FIG. 1.
Figure 3:
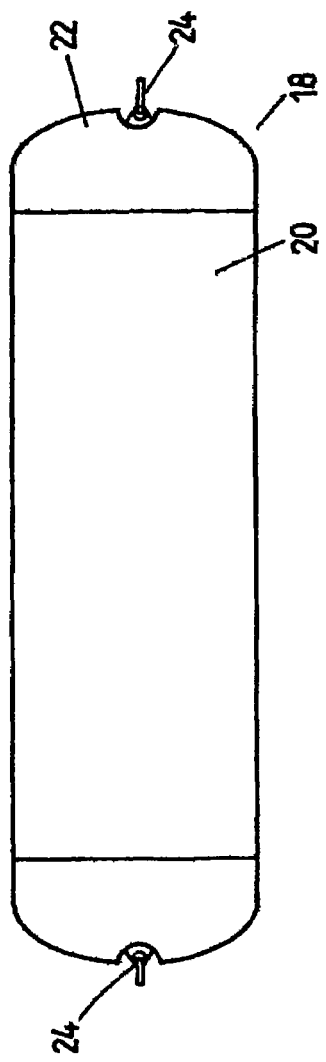
FIG. 3 is a side view of a segment of the bend restriction means of FIG. 1.

Following construction of each of the lengths of pipeline 14, a bend restriction means 16 is secured along the length of pipeline 14. The bend restriction means 16 comprises a plurality of endwise connected bend restrictor segments 18. FIGS. 2 and 3 show an embodiment of the bend restrictor segments 18 and the bend restriction means 16 shown in FIG. 1. The bend restrictor segments 18 each comprise a cylindrical element 20 having longitudinally opposed hemispherical ends 22. Each cylindrical element 20 is secured to adjacent cylindrical elements 20 by a flexible elongate member 24, such as a chain or cable, connecting between points located centrally on the hemispherical ends 22.

The length of each flexible elongate member 24 and the dimensions of the cylindrical elements 20 are arranged so that when a cylindrical element 20 is such that the longitudinal axis of the cylindrical element 20 has moved from being coaxial with the longitudinal axis of a connected cylindrical element 20 by a predetermined angle, the hemispherical ends 22 of those connected cylindrical elements 20 come against each other preventing further movement. By setting the maximum angle allowed between the longitudinal axes of the adjacent cylindrical elements 20 for cylindrical elements 20 of known length, the bend restriction means 16 will only bend to a limited degree, as shown in FIG. 3. The bend restriction means 16, when secured along the length of pipeline 14 would thereby prevent excessive bending of the length of pipeline 14 and would allow the setting of a minimum bend radius for the length of pipeline 14. As shown in FIG. 1, the bend restriction means 16 is arranged adjacent the length of pipeline 12 and connected along the length by connections between each bend restrictor segment 18 and the length of pipeline 14.

The method and apparatus for laying the pipeline 10 also involves the use of flotation means 26 attached to the length of pipeline 12 along the length. In the embodiment shown in FIG. 1, the flotation means 26 comprises a plurality of flotation modules 28, each flotation module 28 being connected to a respective bend restrictor segment 18. The flotation means 26 is arranged such that the length of pipeline 14 will float adjacent the surface of the ocean. The length of pipeline 14 can then be secured to a suitable pull barge or tug boat 29 and towed to the desired location. It is noted that the pull barge or tug boat 29 required will not need to be of the specialized type conventionally used in pipe laying operations, thereby saving costs.

Figure 4:
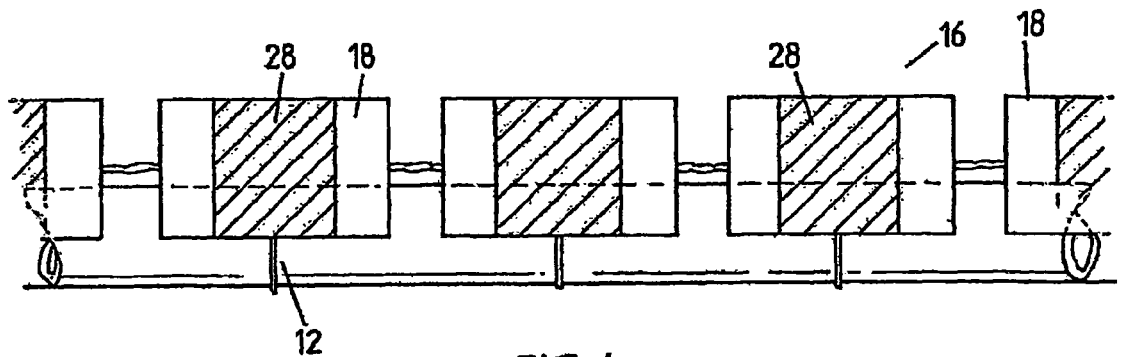
FIG. 4 is a side view of a length of pipeline prepared for laying according to an alternative embodiment of the present invention.
Figure 5:
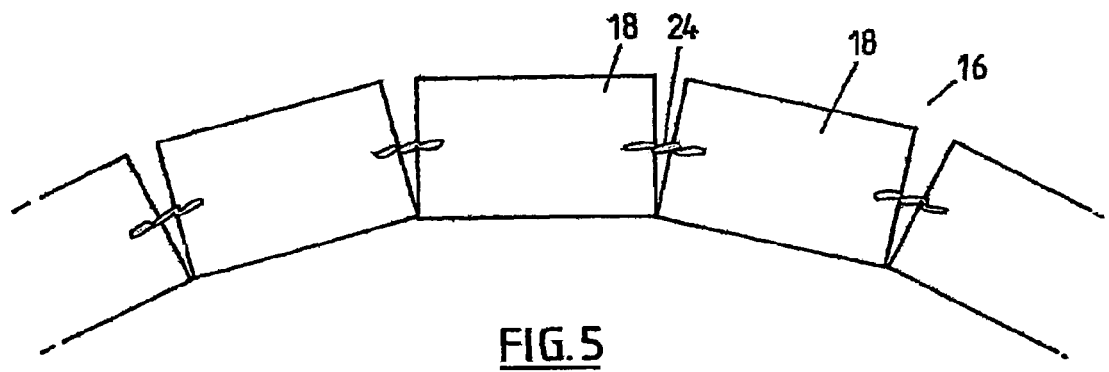
FIG. 5 is a side view of the bend restriction means of FIG. 4.
Figure 6A:
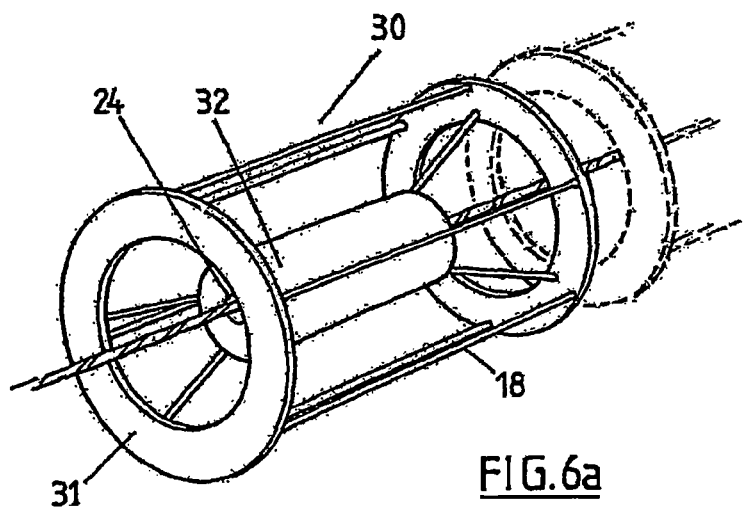
FIG. 6a is a side view of a segment of the bend restriction means of FIG. 4.
Figure 6B:
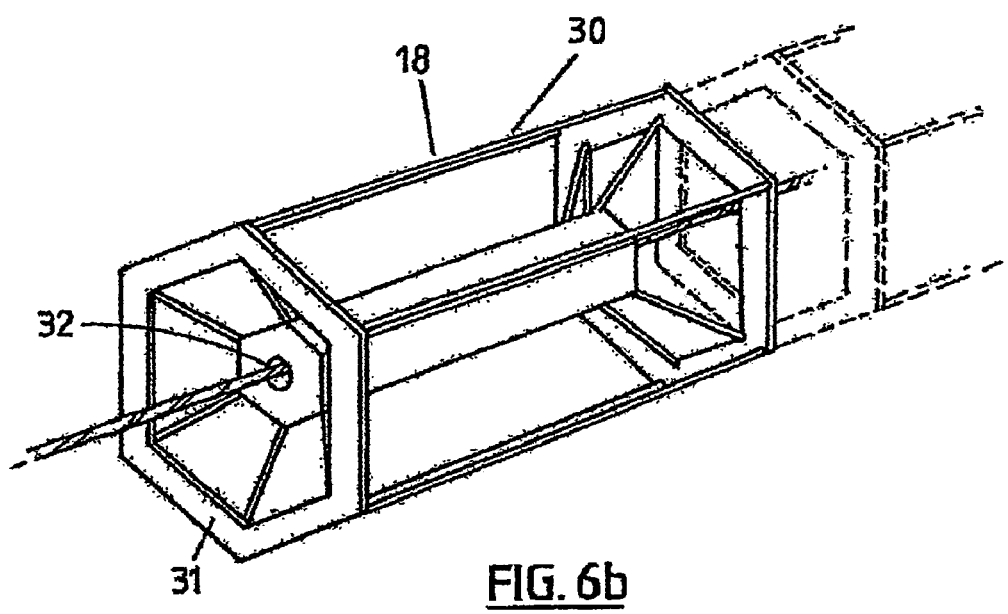
FIG. 6b is a side view of an alternative embodiment of a segment of the bend restriction means of FIG. 4.
Figure 6C:
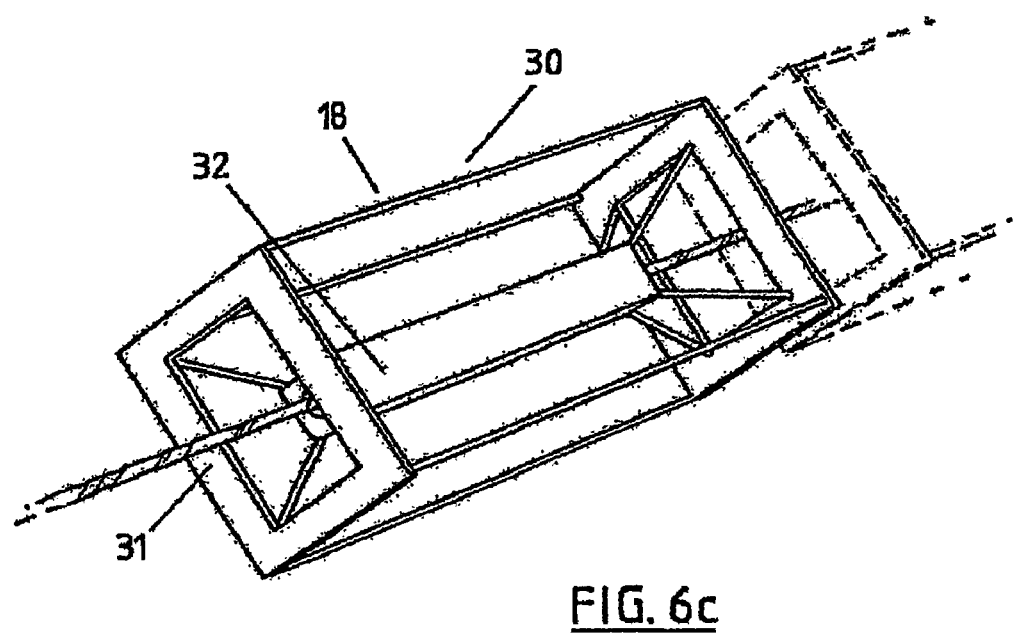
FIG. 6c is a side view of a further alternative embodiment of a segment of the bend restriction means of FIG. 4.
Figure 6D:
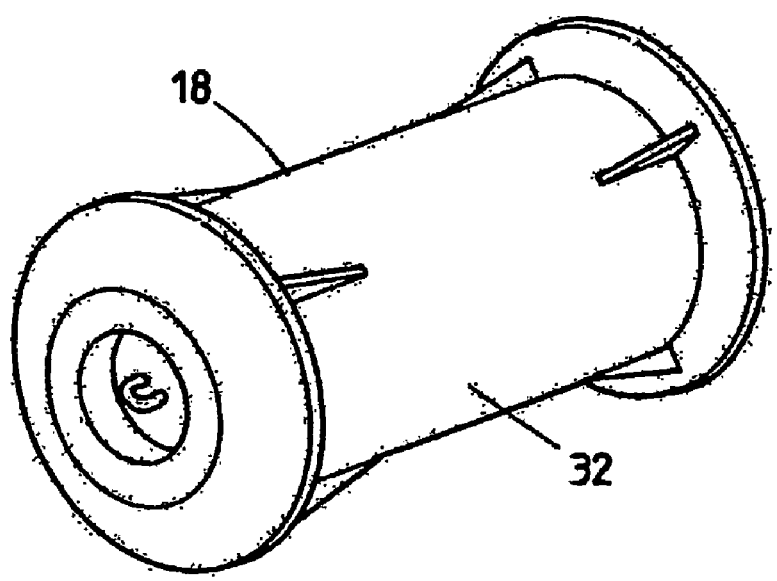
FIG. 6d is a side view of a further alternative embodiment of a segment of the bend restriction means of FIG. 4.

FIG. 4 shows an alternative embodiment of the invention as shown in FIG. 1. In this embodiment, the bend restriction means 16 comprises bend restrictor segments 18 as shown in FIGS. 6a, 6b, 6c, and 6d. The bend restrictor segments 18 are secured by flexible elongate members 24 and function to restrict bending of the lengths of pipeline 14 generally as described previously. While the bend restrictor segments 18 do not have the hemispherical ends 22 of the bend restrictor segments 18 shown in FIGS. 2 and 3, the longitudinally opposed ends 31 perform the same function. The bend restrictor segments 18 each comprise a frame 30 supporting an internal flotation module 32. The frame 30 comprises a cylinder or a prism having a cross section of any suitable shape. For example, the frame 30 of FIG. 5b comprises a hexagonal prism and the frame 30 of FIG. 5c comprises a rectangular prism. The flotation modules 32 are located inside the frame 30 along the longitudinal axis of the bend restrictor segment 18. Each of the bend restrictor segments 18 is connected to adjacent bend restrictor segments 18 by flexible elongate members 24 connected between the adjacent ends of the flotation modules 32. In this embodiment, separate flotation modules are therefore not required.

Figure 7A:
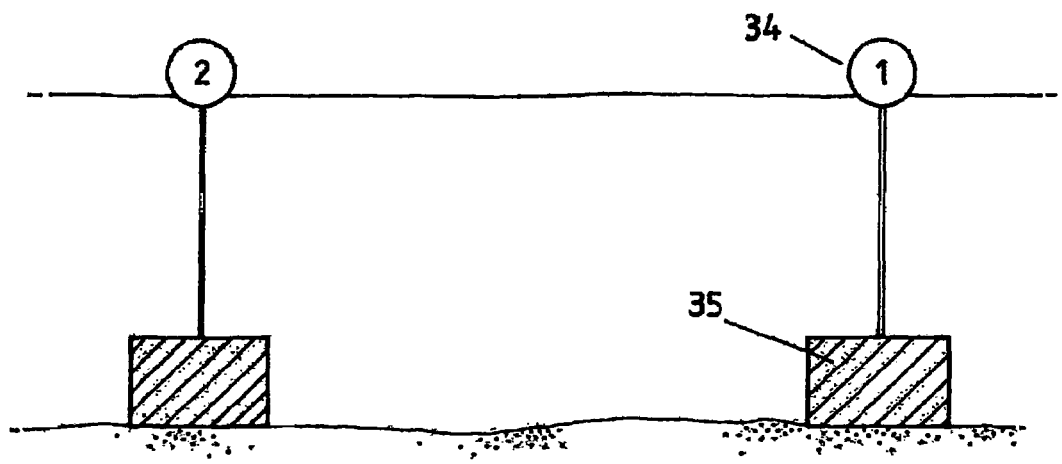
FIG. 7a is a side view of pipeline location means for use with the method of the present invention.
Figure 7B:
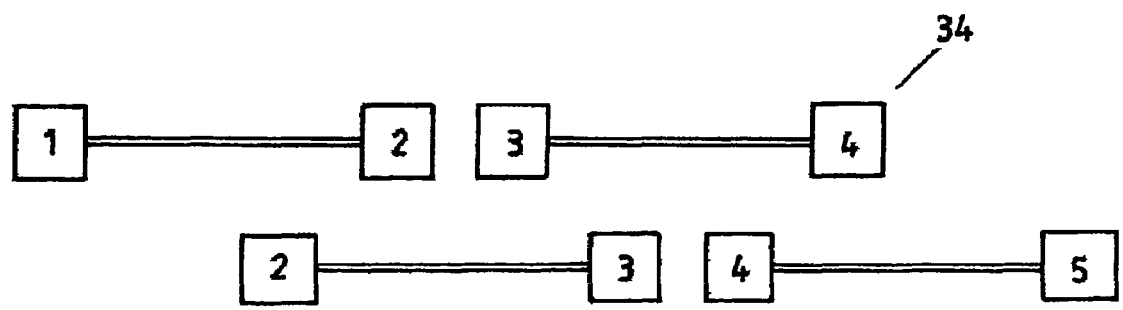

The lengths of pipeline 14 are towed to the desired location which will preferably have been prior marked based on surveys of the ocean floor. Markers 34 are shown in FIGS. 7a and 7b may be used to mark the location of the desired route of the pipeline 10.

Figure 8:
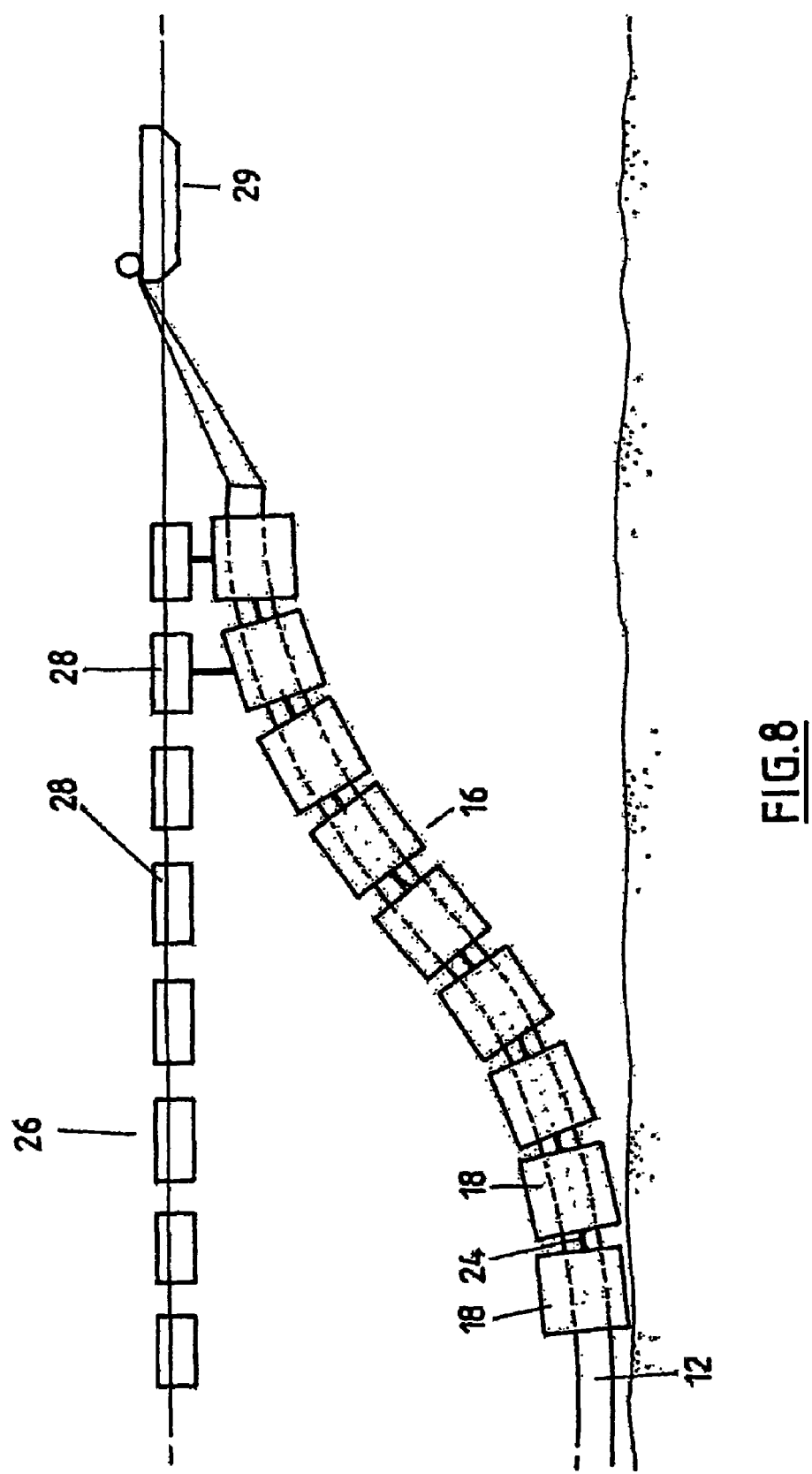
FIG. 8 is a side view of the pipeline of FIG. 1 during laying of a length of pipeline.

As shown in FIG. 8, using the embodiment of the invention shown in FIG. 1, the length of pipeline 14 is then laid by simply disconnecting the flotation modules 28 from the bend restriction means 16, thereby allowing the length of pipeline 14 to sink to the ocean floor. The bend restriction means 16 prevents excessive bending of the length of pipeline 14 both during the towing operation and as the length of pipeline 14 sinks to the ocean floor, thus preventing damage. Alternatively, using the embodiment in FIG. 4, the buoyancy of the flotation modules 28 may be altered by filling with sea water to allow the length of pipeline 14 to sink to the ocean floor.

Figure 9:
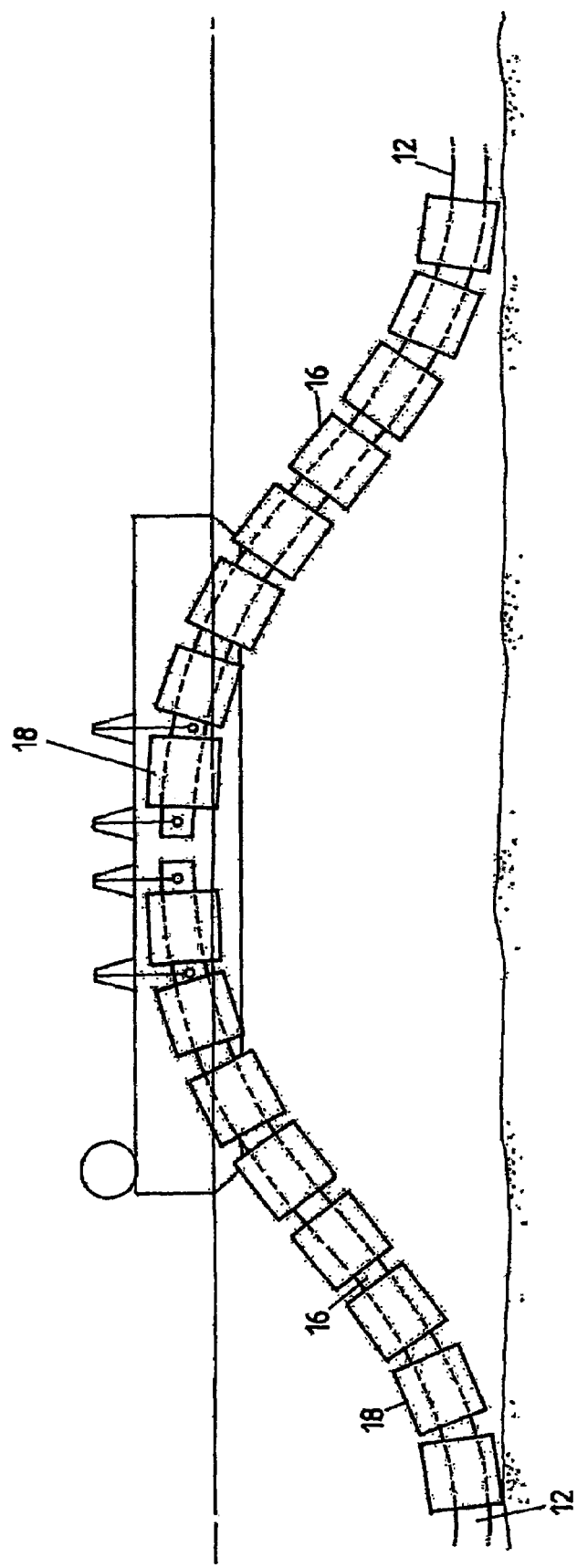
FIG. 9 is a side view of the connection of adjacent lengths of pipeline.
Figure 10:
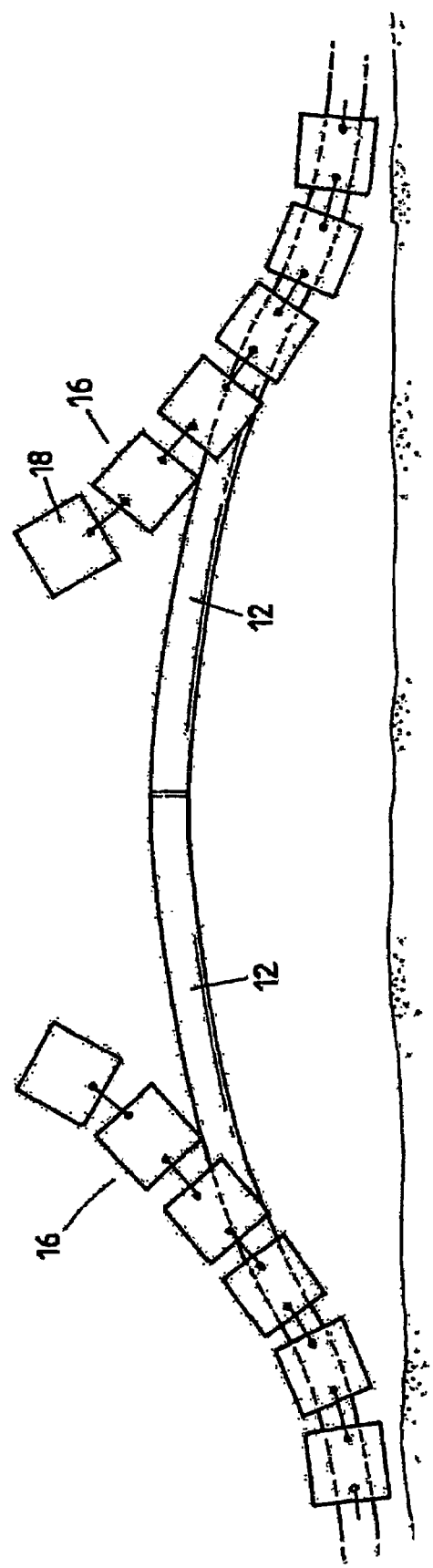
FIG. 10 is a side view of the release of the bend restriction means.

Once on the ocean floor, the bend restriction means 16 is removed from each length of pipeline 14 with the exception of a portion of the bend restriction means 16 adjacent the ends of the length of pipeline 14. The ends of adjacent lengths of pipeline 14 are then raised to the surface, as shown in FIG. 9, by a davit lift and connected in a known manner. The portions of the bend restriction means 16 adjacent the ends of the lengths of pipeline 14 prevents damage to the lengths of pipeline 14 during the tie-in operation.

The connected lengths of pipeline 14 are then placed back on the ocean floor and the portions of the bend restriction means 16 adjacent the ends of the length of pipeline 14 are removed. The bend restriction means 16 may be released from the lengths of pipeline 14 by any suitable means, such as a snatch block or a diver assisted operation.

Modifications and variations as would be apparent to a skilled addressee are deemed to be within the scope of the present invention.

The invention claimed is:

1. A method for laying an underwater pipeline comprising the steps of:
   (i) constructing lengths of pipeline by endwise connection of a plurality of pipe segments;
   (ii) securing bend restriction means to said lengths of pipeline, said bend restriction means comprising a plurality of bend restrictor segments, each bend restrictor segment being connected to an adjacent bend restrictor segment by a flexible elongate member so that the length of pipeline is prevented from bending by more than a predetermined maximum amount;
   (iii) securing flotation means to the lengths of pipeline such that the lengths of pipeline are held adjacent to the surface of the ocean;
   (iv) towing the lengths of pipeline to a desired location; and
   (v) connecting each length of pipeline to an adjacent length of pipeline and altering the buoyancy of the flotation means or releasing the flotation means from each length of pipeline so that the length of pipeline sinks to the ocean floor.

2. A method for laying an underwater pipeline in accordance with claim 1, wherein the flotation means comprises a plurality of flotation modules connected in series, the method including the steps of securing each of the flotation modules to a respective bend restrictor segment.

3. A method for laying an underwater pipeline in accordance with claim 1, including the step of removing the bend restriction means from each of the lengths of pipeline with the exception of a portion of the bend restriction means adjacent an end of the length of pipeline after each length of pipeline has descended to the ocean floor.

4. A method for laying an underwater pipeline in accordance with claim 3, including the step of raising the ends of adjacent lengths of pipeline to the ocean surface, connecting said adjacent ends together and lowering the connected adjacent ends to the ocean floor.

5. A method of laying an underwater pipeline in accordance with claim 4, including the step of removing the portions of the bend restriction means from the ends of the lengths of pipeline once the adjacent lengths of pipeline have been connected and lowered to the ocean floor.

6. A method for laying an underwater pipeline in accordance with claim 1, wherein altering the buoyancy of the flotation means comprises at least partially filling the flotation means with sea water.

7. A method for laying an underwater pipeline in accordance with claim 1, including the step of placing a plurality of floating markers secured to locations on the ocean floor along the proposed route of the underwater pipeline.

8. An apparatus for laying an underwater pipeline comprising:
   bend restriction means comprising a plurality of bend restrictor segments connected in series arranged to be secured to lengths of pipeline formed by endwise connection of a plurality of pipe segments, each bend restrictor segment being connected to adjacent bend restrictor segments by a flexible elongate member, the length of the flexible elongate member and the dimensions of the bend restrictor segments being arranged such that the bend restriction means will bend to no more than a predetermined minimum bend radius; and
   flotation means arranged to be secured to the lengths of pipeline such that the lengths of pipeline are held adjacent the surface of the ocean;
   wherein the flotation means are releasable from the length of pipeline or can have their buoyancy altered such that the lengths of pipeline can be towed to a desired location and sunk to the ocean floor by release of the flotation means or altering the buoyancy of the flotation means.

9. An apparatus for laying an underwater pipeline in accordance with claim 8, wherein the flotation means comprises a plurality of flotation modules connected in series, each flotation module being connected to a respective bend restrictor segment.

10. An apparatus for laying an underwater pipeline in accordance with claim 8, wherein each of the bend restrictor segments comprises a solid cylindrical element having longitudinally opposed hemispherical ends, the flexible elongate memers being connected between adjacent cylindrical elements at points located centrally on adjacent hemispherical ends.

11. An apparatus for laying an underwater pipeline in accordance with claim 8, wherein each of the bend restrictor segments comprises a frame having one of the flotation modules mounted within.

12. An apparatus for laying an underwater pipeline in accordance with claim 11, wherein the frame is constructed as a cylinder or prism and the flotation module is located along a central longitudinal axis of the frame.

13. An apparatus for laying an underwater pipeline in accordance with claim 12, wherein the flexible elongate members are connected between adjacent ends of the flotation modules of adjacent bend restrictor segments.

* * * * *